Oct. 19, 1965     C. CAPRIOLI     3,212,907

FOOD PACKAGE AND TRAY

Filed Nov. 19, 1962     3 Sheets-Sheet 1

INVENTOR
Carlo CAPRIOLI

ATTORNEY

INVENTOR
Carlo CAPRIOLI

ATTORNEY

Oct. 19, 1965         C. CAPRIOLI         3,212,907
                    FOOD PACKAGE AND TRAY
Filed Nov. 19, 1962                    3 Sheets-Sheet 3

INVENTOR
Carlo CAPRIOLI
ATTORNEY

United States Patent Office 3,212,907
Patented Oct. 19, 1965

3,212,907
FOOD PACKAGE AND TRAY
Carlo Caprioli, Montreal, Quebec, Canada, assignor to Plastic Packaging Products Ltd., Montreal, Quebec, Canada
Filed Nov. 19, 1962, Ser. No. 238,687
Claims priority, application Canada, Mar. 27, 1962, 845,367, Patent 688,342
5 Claims.  (Cl. 99—171)

This invention relates to the packaging of commodities, particularly edible commodities like biscuits and candies.

At the present time, biscuits for example, are commonly packaged in a single-face corrugated-paper prescored folded support and dividing member in which the biscuits are laid and the whole enveloped in a cellophane bag. Thus the biscuits are clearly visible from the top and sides of the bag but are held in an orderly relationship as long as the bag is intact. This method of packaging has the disadvantage that the support and dividing member is not sufficiently rigid to retain its form and has to be controlled by the operator when filling the package. It has the further disadvantage that once the outer cellophane wrapper is removed, there is nothing to prevent it from returning to its original shape as a flat piece of paper releasing the biscuits and allowing them to escape.

The applicant has now developed a package which provides the same advantages, in terms of display, but, in addition, avoids the disadvantages mentioned above. The applicant uses, as the supporting and dividing member, an elongated tray, molded from a thermoforming plastic material, a tray which is normally self-supporting and shape-retaining and has a locally deformable and shape-reassumable thin continous resilient skin molded from a thermoformable material, in the form of a body preferably provided with one or more upright duplex partitions. These partitions define the ends of the tray and divide it into compartments. Each partition includes a pair of spaced apart walls joined at the top in a spine, and a floor in each compartment integrally joined to two of the walls. The walls of the floor are provided overall with fluting preferably extending longtudinally of the body. The skin of the tray is crisply resilient like glassine paper, thereby providing a cushioning contact with the contents. On the underside of the tray, the partition walls due to their formation enclose a space to receive the partitions of a similar tray in nesting relationship. The walls and floor are drawn to thin gauge and are sufficiently stiff as to be self-supporting but finger-deformable into a blister, returnable by the resilience of the material to its original form by pressure. The material is preferably markedly thicker at the wall connecting spines, thereby to provide an integral skeleton or frame, making the tray more self-supporting under a load. Preferably, each compartment is provided with side walls integrally connected to its floor and to the lower part of its end walls. This construction has a skirt at each side of the body connected to the side edges of the duplex transverse walls and to the top edges of the side walls along a spine. This skirt is spaced from the side walls to provide the characteristic duplex structure of the transverse walls. The transverse walls and floors are provided with fluting extending longitudinally of the body, and preferably the side walls and skirt are provided with fluting extending in the transverse direction of the body. This fluting braces the skin, giving it a stiffness in the direction of the flutes. The walls are as previously mentioned, resilient and provide a cushioning contact with the contents.

Having thus generally described the nature of the invention, it will be referred to in more detail by reference to the accompanying drawings in which.

Figure 1:
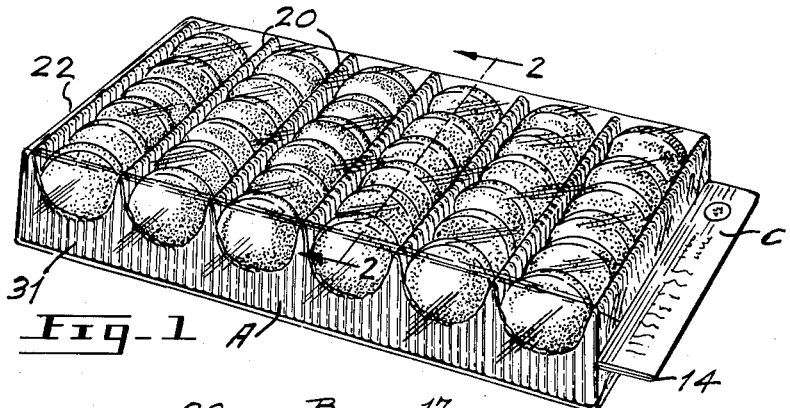
FIGURE 1 is a top perspective view showing by way of an example a typical biscuit package embodying a supporting tray according to the invention.

Referring more particularly to the drawings, the package shown in FIGURE 1 is made up of a tray or support-divider member A according to the invention and containing biscuits B and being wrapped in a cellophane bag C, having a gathered stiffened closure 14 in which the bag material is sandwiched between paperboard.

In accordance with the invention, the tray A comprises a thin walled resilient body having a number of compartments each having a floor 15 which is integrally joined to transverse walls 17 and 19 constituting duplex partitions and side walls 21. The transverse panel 17 of one compartment is integrally joined to the transverse panel 19 of the adjacent compartment in a spine 20. The transverse panels 17 and 19 respectively of the end compartments are joined, in spines 22, to end panels 23 and 25 respectively.

The tray is provided with a side border member or skirt 31 which is integrally joined to the edges of the transverge panels 17 and 19 and 23 and 25 and to the tops of the side walls 21 in spines.

As best shown in the bottom plan view, the transverse panels 17 of the compartments are spaced from the transverse panels 19 of the adjacent compartments except where they are joined at the top and the side border member is spaced from the side walls of the compartments except where joined at the top.

Longitudinally extending half moon-shaped duplex shallow partitions 26 are spaced apart within each of the compartments and extend between the walls 17 and 19, respectively. This structure gives added rigidity to the tray, but in other forms, as illustrated in later figures, can be eliminated.

Longitudinally extending substantially washboard fluting 37 covers the floor and transverse panels of the compartments and the end panels of the tray. Transversely extending similar fluting 39 covers the side walls and side border member. This longitudinal and transverse fluting gives rigidity to and braces against buckling the otherwise flexible skin of the tray. The connection between the side walls and the side border member and between the ends of the transverse panels and said member give longitudinal rigidity to the tray.

In the molding process which will be described later, the material remains thicker at the top of the article, for example at the juncture between the walls 17 and 19 and between the walls of the end partitions 17 and 19 and the end walls 23 and 25, providing the transverse integral spine portions 20. Likewise, there are thicker spine portions 24 between the side walls 21 and the side border member 31, the spine portions 22 connecting up with the spine portions 24 so as to provide in effect a strengthening frame. This is of importance where the over-all thickness of the molded plastic is reduced to a degree where it would not normally be self-supporting.

An important feature of the preferred containers of the invention is the cushioning feature. The duplex partitions 17, 19 are relatively thin and there is a cushion of air between the partitions 17 and the adjoining partition 19 and likewise between the partitions 17 and 19 of the end compartments and the end walls 23 and 25. Also, the side walls 21 of the respective compartments are separated by a cushion of air from the side border member or skirt 31 in a duplex structure. The cushioning of the panels and walls lessens shock to the contents and prevents breakage, for example, in the base of biscuits. The side walls 21 can be made lower or lighter depending on the contents. Where there are several layers of biscuits it is sometimes desirable to have a higher side wall to prevent sideways escape. At other times it is desirable to have the side walls low-cut better to display the contents.

Figure 8:
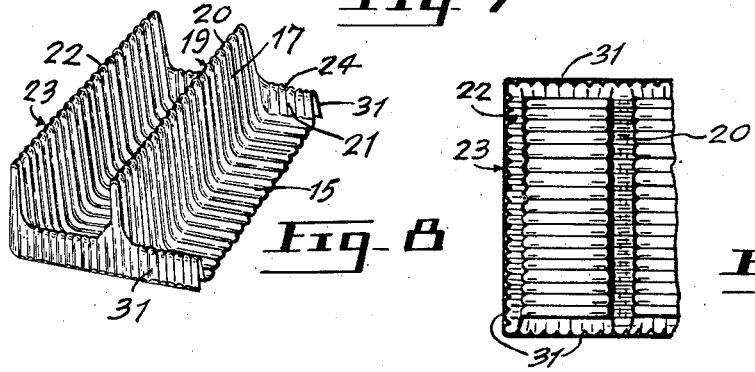
FIGURE 8 is a fragmentary top perspective view of another form of tray according to the invention.
Figure 9:
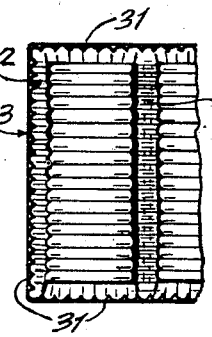
FIGURE 9 is a fragmentary bottom plan view of the tray shown in FIGURE 8.
Figure 10:
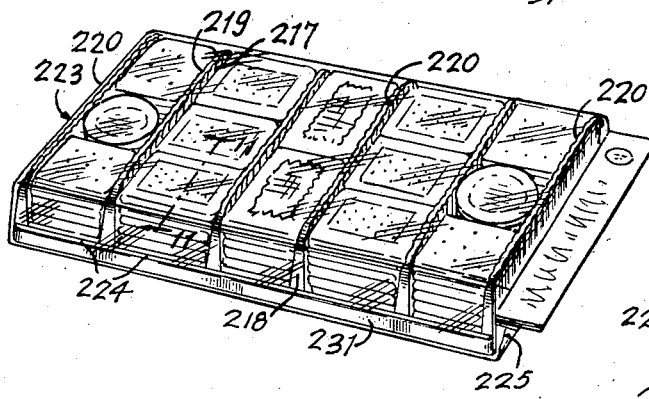
FIGURE 10 is a perspective view of a complete biscuit package according to the invention, employing an alternative form of tray.
Figure 11:
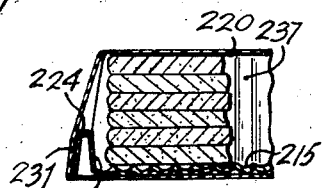
FIGURE 11 is a fragmentary cross-section along the line 11—11 of FIGURE 10.
Figure 12:
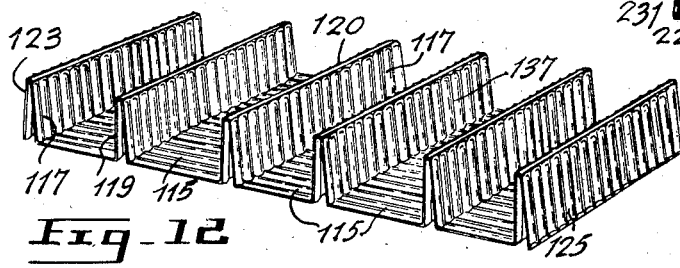
FIGURE 12 is a top perspective view of a still further alternative form of tray.

Alternate forms of trays are shown in FIGURE 8, in which the side walls are of different shape and height to those of the tray shown in FIGURE 1. FIGURE 10 shows still another alternative form of container with low-cut side walls of another type.

This form of tray has a substantially flat floor 215 the walls 217 and 219 form therebetween duplex partitions, as do the respective end walls 217 and 219 with the end walls 223 and 225 of the tray. In this construction, the side walls 221 are shallow and in the form of a border or rim. They are connected with a skirt or side border member 231, which in this case, is also shallow, by a horizontal, in this case, relatively wide web or spine 224. The same characteristic duplex structure is thus inherent in the walls 221, the spines 224 and the skirt 231. The walls 217 and 219 have, in this case, a flat integral spine 220, connecting them and connecting the wall 217 of the end partition with the end wall 223, as well as the wall 219 of the other end partition, with the end wall 225. This spine continues down the sides of the walls 217, 219, 223 and 225, respectively, to complete the duplex partition, and joins the top of the side border member, in this case merging with the spine 224. In this particular construction, the draw to form the duplex side members 221, 224 and 231, is relatively shallow, so that this portion of the container is relatively thick, and forms a supporting frame running along the side of the tray to give it longitudinal rigidity. Likewise, the spines 220 are relatively thick, as are the side parts 218, so as to complete a frame structure, which is relatively thick, as compared for example, with the floors 215 and walls 217, 219, 223 and 225.

In all trays shown in FIGURES 1 to 10, the duplex wall structure is featured, both in the transverse, as well as the longitudinal walls.

Figure 2:
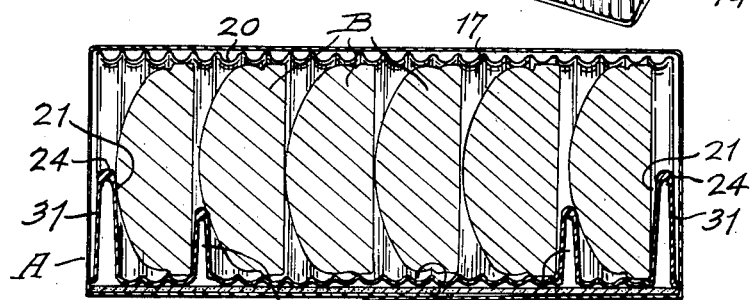
FIGURE 2 is an enlarged cross-section substantially along the line 2—2 of FIGURE 1.

It will also be noted, and as shown most clearly in FIGURE 2, that in the preferred constructions the outer skirt 31 extends to at least the level of the tray floor. This makes it possible in producing the trays in question in production quantities to serve the individual molded trays from a common sheet of material by passing a cutting blade horizontally beneath the floor portions. This procedure is described in detail in the applicants co-pending United States application, Serial No. 224,061, filed September 17, 1962, issued as United States Letters Patent, 3,163,067 on December 29, 1964.

A less preferred form without any side walls to the compartments is shown in FIGURE 2. This tray is of advantage over the conventional glassine paper folded strip since the respective transverse duplex partitions 117 and 119 are held apart resiliently by their connecting spines 120, in the molded structure to provide a cushion of air between the adjacent partitions 17 and 19. The molding process tends to form a strengthening spine of thicker material at the juncture of each respective partitions 17 and 19.

Figure 13:
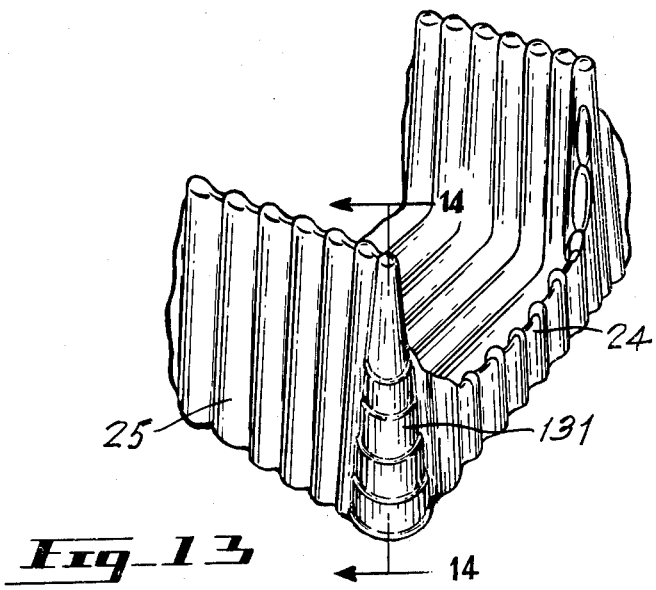
FIGURE 13 is a view in perspective elevation of one corner of any of the tray constructions illustrated to show a preformed stepped conformation preventing possible fracture of the outer skin at that point.
Figure 14:
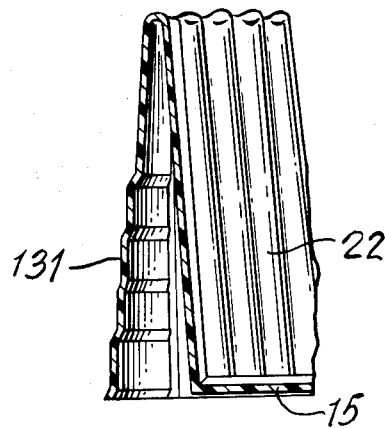
FIGURE 14 is an enlarged sectional view of FIGURE 13 along the line 14—14.

A further feature with respect to the manufacture of the trays of the invention is shown in FIGURES 13 and 14. It has been found that in some instances, depending on the material employed that the corners of the outer walls or skirt (31 for example) had a tendency to crack at the lower extremities. As shown in FIGURE 13 this is overcome by shaping, in molding, the corners 131 in a distinct rounded form and incorporating ring like corrugations or steps which add considerably to the strength and prevent possible cracking as mentioned above. As shown most clearly in FIGURE 14 the corner 131 is molded in a rounded upwardly tapering form with a plurality of semi-circular shoulders or reinforcing leads molded in spaced sequence along at least the lower part of the tapering form.

The tray structures described molded from a suitable thermoforming material, preferably polystyrene, enables a very thin skin which looks like glassine paper, constituting the major area of the floor and walls of the compartments particularly the transverse walls, to be employed. At the same time the tray is adapted, unlike a folded corrugated paper strip of the type used in biscuit packages, to maintain its form under a considerable amount of weight or force tending to push it out of shape. For example, the tray, full of biscuits, can be held at one end with the load of biscuits, without buckling. At the tops of the respective transverse walls where they meet integrally, there is a spine where the material is thicker than it is on the body of the walls or on the body of the floor. Likewise, along the top of the side border member the material is also thicker, forming a continuation of this spine, so that you have a reinforcing construction, just as if a wire frame had been run along the spine and border. Further, while the material is paper-thin, it has characteristics which are not possessed by paper, in that it flows, during the molding operation, to give a difference in thickness at different parts, and at the same time, can be molded into rounded corners as previously mentioned, at the ends of the structure, which give added strength.

Even in the case of the simplest form of tray, without any side-supporting member, the junction of the transverse walls is such that the relative inclination of these walls is maintained, more or less, when the tray is at rest and without any weight in it, so that there is a cushioning air space between the walls, except at the top. Also, the inclination between the walls and the floor is maintained by the resilient nature of the plastic material, which has an elastic memory tending to spring the parts back into their original molded position, even if displaced by a force overcoming the elasticity or resiliency of the tray.

Therefore, the tray has a resiliency adapting it to come back to its normal "at rest" position, when bent out of that position, below its breaking point. The material as molded is naturally somewhat brittle and crackly, and this is desirable, since it gives the general impression of glassine paper, and thus looks like the material the customer is accustomed to seeing in a biscuit or candy package. The material is thus, while having the many advantages described over glassine paper, not a radical departure from the natural biscuit package image to which the customer is used, and so does not face the resistance often encountered by a new material. The material is sufficiently similar in appearance and other characteristics to the material at present used, that the customer is not disturbed by the innovation.

The same general effect is obtained, as with corrugated paper, except that with paper you have to have a backing and a facing and there is no inherent self-supporting characteristic. In the present structure, the corrugations maintain their own shape, without requiring a strengthening backing or facing.

*Manufacture*

The tray is made by vacuum forming methods which are known per se, so that the actual method of forming is not claimed except insofar as it applies to this specific type of article.

Briefly, the tray is made by the following steps. A sheet of the plastic thermoforming material of the necessary thickness to give the article, as defined herein, is mounted in a frame. The sheet in the frame is softened by heating. The thus softened sheet is draped over a male mold carrying in relief the design of a plurality of trays of the type described.

The draped softened sheet is drawn into intimate contact with the mold face by vacuum whereby the draped material forms a skin on the surface of the mold. Plugs or wires may be used to push the plastic material down into proximity to the mold so that the vacuum can take effect. The mold is generally treated in advance with a silicone or other release material so that the plastic skin will not stick to the mold surface. The material is then cooled on the mold, for example by a draft of air. The molded shape is then parted from the mold by blowing air through the vacuum openings.

In the vacuum forming process the material at the crowns of the partitions and of the side walls tends to remain thicker than on the floor and in the partitions proper thus providing a skeleton which helps to maintain the rigidity of the structure, while keeping the thickness of the skin on the central areas of the floor and panels at a minimum to conserve material and to provide substantially the aesthetic characteristics of paper.

Generally, about ten or fifteen of the trays are molded at the same time. Once the molded shape is removed from the mold, the respective articles are separated and trimmed to the final size. As previously mentioned this is described in detail in copending United States application, Serial No. 224,061, filed September 17, 1962.

The trays made in this manner are now ready for filling. They can be much more easily handled in the filling operation by reason of the fact that they retain their form and present respective compartments in which the biscuits or other commodities can easily be put without the necessity of the operator at the same time having to control the shape of the tray as in the case of the accordion-like glassine paper support which is normally used.

A preferred molding material is polystyrene which may be of low, medium or high impact strength. The molded material can be clear or coloured and on being molded in the thickness specified has substantially the appearance and feel of glassine paper.

Other thermoforming plastic materials may be employed providing they are capable of being molded to the thinness specified to have substantially the characteristics.

The starting sheet which is placed in the frame before being draped over the mold may range from about five to about twelve thousandths of an inch in thickness with seven to nine thousandths of an inch preferred. The molded tray will range in thickness from approximately that of the starting material at its thickness point, for example along the spines between the respective panels to the point of greatest draw, for example at the juncture of the transverse panels and the floor where the material may be as thin as a minimum of about two thousandths of an inch, with the floor of the compartments around three to four thousandths preferred.

Figure 3:
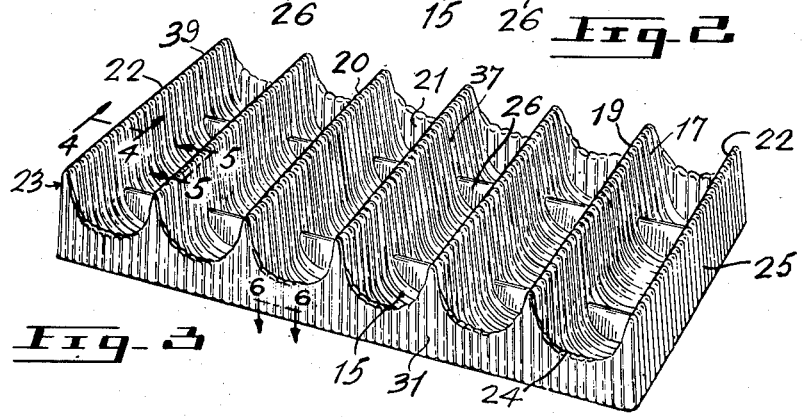
FIGURE 3 is a top perspective view of an empty tray or suport member as embodied in the package shown in FIGURES 1 and 2.
Figures 4, 5, 6:
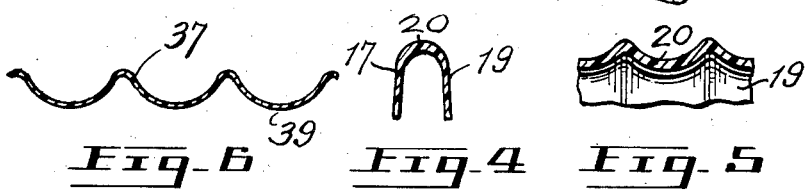
FIGURE 4 is an enlarged fragmentary cross-section along the line 4—4 of FIGURE 3.
FIGURE 5 is an enlarged fragmentary cross-section along the line 5—5 of FIGURE 3.
FIGURE 6 is an enlarged fragmentary cross-section along the line 6—6 of FIGURE 3.
Figure 7:
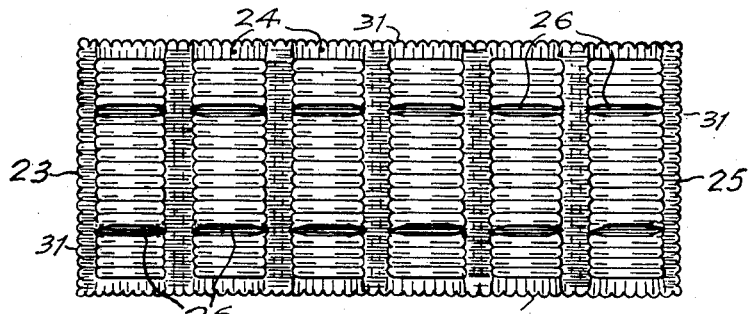
FIGURE 7 is a bottom perspective view of the form of tray shown in FIGURE 3.

The thickness of the starting sheet will depend on the size and depth of the article to be molded. The trays shown in FIGURES 1 and 3 are approximately ten and one-half inches long by four and three-quarters inch wide over-all with the compartments being about one and three-quarters inches in height. In this case these trays were molded from a polystyrene sheet of eight thousandths of an inch in thickness and coloured to give the tray the appearance of being made of coloured glassine paper. The fluting may range from four to six flutes to the inch plus or minus twenty percent.

Among the advantages of the applicant's method of packaging are the following:

(1) The trays are already formed when they come to the filling operation and there is no necessity for skill on the part of the operator in trying to control the shape of the tray at the same time as she is trying to fill it with biscuits or other commodities.

(2) The previous type of package using the glassine paper holder had to be put in an envelope manually because there was no other way of controlling it since it had to be held in shape until under the control of the envelope. The present trays can be wrapped by automatic machinery since they are form-sustaining.

(3) Once the customer removes the outer wrapper he has a self-supporting tray which can be carried around, put in the refrigerator or the breadbox and used actually to serve the biscuits or other articles.

(4) The material from which the trays are made is impervious to moisture, grease, etc., and therefore if there is any leakage from the biscuits or candies the package will not be spoiled. The package is therefore specially applicable to jam-filled biscuits.

(5) A further advantage is that the biscuit pack is bigger than a corresponding pack using a glassine support because of the spacing between the transverse panels of the compartments. This makes the package more attractive.

It will be understood that modification of the exact preferred structure shown and described is contemplated within the scope of the invention. For example, the transverse partitions can be irregularly spaced and can be of varying heights, either all the same, or different. Where there are sides to the compartments, these can be of varying heights, equal or unequal from compartment to compartment. Where desired, the spines can be wider to provide greater division between the respective compartments. Longitudinal partitions can be provided, higher, for example, than those shown in FIGURE 3. The fluting may take a different from although, some form of ribbing or similar deformation of the surface of the walls and floors is preferred, in the broader aspects of the invention, this fluting can be omitted, particularly where there are side walls and a skirt running round the margin of the tray, or the fluting can be used over some areas, not over others. In all cases, however, the thin walled nature of the tray, and the duplex structure provided by the adjoining walls, is preserved to give the necessary rigidity to the otherwise flimsy structure.

I claim:

1. A display-and-packing tray for cookies comprising a one-piece thermo-molded, plastic member, said member comprising a lower substantially planar floor portion, and vertically-extending, duplex partitions at the outer edge of said floor portion and intermediate portions of said floor portion and defining upwardly-opening, commodity-receiving compartment means, said duplex partitions comprising relatively thin, spaced resilient walls integrally connected at upper edges and bordered at upper edges by a continuous, relatively stiff spine substantially thicker than said duplex partition walls depending therefrom and comprising a shape-retaining frame at the upper edges of said tray, said duplex partitions defining an outer, continuous skirt surrounding said floor portion, said floor portion being substantially thinner than said spine, said duplex partitions being substantially fluted to supplement the rigidity afforded by said spine and rigidify said relatively thin duplex walls.

2. The structure of claim 1 in which said continuous skirt includes a lower edge terminating in a plane at least coplanar with the lowermost portion of said floor portion.

3. The structure of claim 1 in which said outer, continuous skirt is generally rectangular and includes upwardly-tapered, post-like corner portions reinforcing the corners of said skirt.

4. The structure of claim 1 in which said tray is generally rectangular in plan, said compartment means comprising a plurality of said intermediate portions extending transversely of said planar floor portion generally normal to said duplex, skirt.

5. The structure as claimed in claim 1 including an edible commodity in said tray compartment means, and a wrapper enclosing said tray and edible commodity.

References Cited by the Examiner

UNITED STATES PATENTS

| | | | |
|---|---|---|---|
| 563,675 | 7/96 | Mullins | 99—171 |
| 2,429,063 | 10/47 | Jones et al. | 217—26.5 |
| 2,604,983 | 7/52 | Moore | 206—45.33 |
| 3,067,921 | 12/62 | Reifers. | |

FOREIGN PATENTS

| | | |
|---|---|---|
| 491,675 | 3/53 | Canada. |
| 879,185 | 10/61 | Great Britain. |

OTHER REFERENCES

"Modern Packaging," January 1953, pages 94, 95 and 182.

A. LOUIS MONACELL, *Primary Examiner.*

ABRAHAM H. WINKELSTEIN, *Examiner.*